US011503947B2

(12) United States Patent
Della Pietra et al.

(10) Patent No.: US 11,503,947 B2
(45) Date of Patent: Nov. 22, 2022

(54) ESPRESSO COFFEE MACHINE WITH SYSTEM FOR CLEANING THE COFFEE DISPENSING SYSTEM

(71) Applicant: LA MARZOCCO S.R.L., Scarperia (IT)

(72) Inventors: Stefano Della Pietra, Scarperia (IT); Roberto Bianchi, Scarperia (IT)

(73) Assignee: LA MARZOCCO S.R.L., Scarperia (IT)

( * ) Notice: Subject to any disclaimer, the term of this patent is extended or adjusted under 35 U.S.C. 154(b) by 269 days.

(21) Appl. No.: 15/765,602

(22) PCT Filed: Oct. 14, 2016

(86) PCT No.: PCT/EP2016/074726
§ 371 (c)(1),
(2) Date: Apr. 3, 2018

(87) PCT Pub. No.: WO2017/067854
PCT Pub. Date: Apr. 27, 2017

(65) Prior Publication Data
US 2019/0075964 A1 Mar. 14, 2019

(30) Foreign Application Priority Data
Oct. 21, 2015 (IT) .................. 102015000064045

(51) Int. Cl.
*A47J 31/60* (2006.01)
*A47J 31/36* (2006.01)
*A47J 31/46* (2006.01)

(52) U.S. Cl.
CPC .......... *A47J 31/60* (2013.01); *A47J 31/3671* (2013.01); *A47J 31/461* (2018.08)

(58) Field of Classification Search
CPC ........ A47J 31/60; A47J 31/461; A47J 31/3671
See application file for complete search history.

(56) References Cited

U.S. PATENT DOCUMENTS 5,133,983 A * 7/1992 Greiwe ............... A47J 31/3614
210/247
5,372,061 A * 12/1994 Albert ..................... A47J 31/46
99/281

(Continued)

FOREIGN PATENT DOCUMENTS

| CN | 101600377 A | 12/2009 |
|---|---|---|
| CN | 103391734 A | 11/2013 |

(Continued)

OTHER PUBLICATIONS

International Search Report for PCT/EP2016/074726, dated Jan. 31, 2017, 2 pages.

(Continued)

*Primary Examiner* — Nirvana Deonauth
(74) *Attorney, Agent, or Firm* — Nixon & Vanderhye P.C.

(57) ABSTRACT

An espresso coffee machine is described, said machine comprising a pump (1) for pumping water, a dispensing group (25) configured to cooperate with a portafilter (35), wherein said portafilter (35) is configured to support a filter (40) loaded with coffee powder, a coffee boiler (15) in fluid communication with said dispensing group (25), a water dispensing system (16, 28, 29, 30) for supplying hot water from said coffee boiler (15) to said portafilter; and a system (16, 31, 6, 33, 14) for supplying steam to said dispensing group (25) so as to perform cleaning of at least a part of said water dispensing system (16, 28, 29, 30).

17 Claims, 9 Drawing Sheets

(56) References Cited

U.S. PATENT DOCUMENTS

| | | | |
|---|---|---|---|
| 6,085,637 A * | 7/2000 | Fukushima | A47J 36/38 |
| | | | 99/279 |
| 8,696,899 B2 * | 4/2014 | Roulin | A61L 2/022 |
| | | | 210/184 |
| 9,125,519 B2 | 9/2015 | Goeltenboth et al. | |
| 2004/0079237 A1 | 4/2004 | Denisart | |
| 2009/0114099 A1 | 5/2009 | Gotlenboth | |
| 2010/0112165 A1 * | 5/2010 | Masciandaro | A47J 31/405 |
| | | | 426/433 |
| 2010/0233337 A1 * | 9/2010 | Aigner | A47J 31/60 |
| | | | 426/431 |
| 2010/0300299 A1 | 12/2010 | Epars et al. | |
| 2012/0118164 A1 | 5/2012 | Tonelli et al. | |
| 2012/0171332 A1 * | 7/2012 | Lai | A47J 31/42 |
| | | | 426/78 |

FOREIGN PATENT DOCUMENTS

| | | |
|---|---|---|
| DE | 10 2013 107077 | 1/2015 |
| EP | 1 747 736 | 1/2007 |
| JP | 2004-534562 A | 11/2004 |
| JP | 2012-035040 A | 2/2012 |
| JP | 2015-518381 A | 7/2015 |
| JP | 2015-144714 A | 8/2015 |

OTHER PUBLICATIONS

English translation of CN Office Action dated Jun. 8, 2021 in CN application 2018-517145.

* cited by examiner

ESPRESSO COFFEE MACHINE WITH SYSTEM FOR CLEANING THE COFFEE DISPENSING SYSTEM

This application is the U.S. national phase of International Application No. PCT/EP2016/074726 filed 14 Oct. 2016, which designated the U.S. and claims priority to IT Patent Application No. 102015000064045 filed 21 Oct. 2015, the entire contents of each of which are hereby incorporated by reference.

BACKGROUND

Field of the Invention

The present invention relates to the sector of beverage dispensing machines, in particular to the sector of espresso coffee machines. Even more particularly, it relates to an espresso coffee machine with a cleaning system for cleaning the coffee dispensing system and the discharging system.

Related Art and Other Considerations

Typically, an espresso coffee machine comprises one or more dispensing groups. The machine is configured to cause pressurized heated water to pass through a puck of coffee powder contained for example in a filter supported by a portafilter. The portafilter is open at the bottom and has a single or double spout from which the beverage flows out. The beverage is collected inside a container, for example a cup.

More precisely, in an espresso coffee machine of the known type, hot water (for example heated in a boiler or the like) reaches a diffuser via a special duct. The diffuser allows the diffusion of the hot water over a so-called screen and consequently allows hot water to flow down through the underlying puck of coffee powder. The flow of hot water through the aforementioned components continues for the entire duration of dispensing of the beverage.

Once dispensing has been terminated, the fluid remaining above the coffee puck and partly that contained inside it, owing to the difference in pressure between the preparation chamber and discharging chamber, reverses its direction and rises back up the system as far as a discharge well.

The screen is substantially in the form of a disk which is suitably perforated so as to allow the uniform flow of hot water towards the coffee puck during dispensing and, at the same time, prevent the particles of coffee powder from rising back up at the end of dispensing owing to the pressure difference.

The Applicant has noted that, during the discharging process, small particles of used coffee rise back up through the holes of the screen into the diffuser and inside the duct as far as the discharge well, causing at least partial blocking of the system and therefore resulting in the need for consequent operations for maintenance of the aforementioned components.

This functional deterioration is accelerated by the hot used coffee which remains inside the aforementioned components during periods of inactivity of the machine.

The Applicant has also noted that, since some of the components present in the discharging system are also components belonging to the dispensing system, the presence of used coffee particles results in a harmful alteration of the organoleptic properties of the espresso coffee which is dispensed.

The Applicant has also noted that the presence of used coffee in the dispensing system may cause, over time, a reduction in the useful area for through-flow of the dispensing water and consequently the creation of preferential flow paths which may result in a reduced use of the coffee puck. In other words, the hot water does not pass uniformly through the coffee puck during dispensing.

The Applicant has also noted that the presence of used coffee in the discharging system in some cases results in a reduction in the discharging efficiency with the consequent presence of liquid above the coffee puck. This is particularly disadvantageous for the user when separating the portafilter from the dispensing group.

Some baristas, before engaging a portafilter for a new dispensing operation, allow a small quantity of hot water to flow out from the screen for a few moments. With this operation the circuit upstream of the screen and the screen itself are rinsed. However, in order to clean the screen properly, the barista must disassemble it, typically by unscrewing a central screw. Once disassembled, the barista cleans the screen using a chemical product and/or mechanical implements (such as a brush). The manufacturers of espresso coffee machines recommend disassembling the screen at least at the end of every working day.

It is clear that disassembling the screen every day and cleaning it is a long and awkward task which is not liked by baristas. Whatever the case, during most of the day, the screen and the rest of the dispensing/discharging system are dirty and accumulate particles of used coffee.

DE-A-102013107077 discloses an arrangement with a hot-drink machine.

BRIEF SUMMARY

The object of the present invention is therefore to provide an espresso coffee machine with a cleaning system for cleaning in a quick and efficient manner the screen and other components of the coffee discharging and dispensing circuit. In this way at least some of the aforementioned drawbacks are eliminated.

The present invention provides accordingly an espresso coffee machine which uses the steam to clean in an effective manner at least part of the coffee dispensing system and at least some components (typically those which are common to said coffee dispensing system) of the discharging circuit. Preferably, the steam used for cleaning is taken from a boiler (or other steam generator) which is already usually present in an espresso coffee machine in order to allow the preparation of other beverages such as cappuccino, frothed milk or the like.

According to a first aspect of the present invention, an espresso coffee machine is provided, said coffee machine comprising:
  a pump for pumping water
  a dispensing group configured to cooperate with a portafilter, wherein said portafilter is configured to support a filter loaded with coffee powder,
  a coffee boiler in fluid communication with said dispensing group,
  a water dispensing system for supplying hot water from said coffee boiler to said portafilter; and
  a system for supplying steam to said dispensing group so as to perform cleaning of at least a part of said dispensing system.

The water dispensing system may comprise a screen.

The machine preferably also comprises a steam boiler. The steam supplied to the dispensing group is taken from said steam boiler.

The steam dispensing system preferably comprises a steam valve body with a plurality of ways, wherein one way is in fluid communication with the steam boiler.

The steam dispensing system preferably comprises a group valve body which is mounted on the group and a pipe which connects the group valve body to said steam valve body, so that the cleaning steam may flow from said steam boiler to said dispensing group passing through said steam valve body, said pipe and said group valve body.

Another way of said steam valve body preferably is connected to a discharge pipe for discharging water after dispensing an espresso coffee.

The machine preferably further comprises a sensor configured to detect whether the portafilter is connected to said dispensing group.

The machine preferably further comprises a processor so that supplying of steam to said dispensing group is carried out depending on a signal received from said sensor.

The machine preferably comprises two or more dispensing groups.

According to another aspect the present invention relates to a method for cleaning a water dispensing system of an espresso coffee machine, wherein the machine comprises:
 a pump for pumping water
 a dispensing group configured to cooperate with a portafilter, wherein said portafilter is configured to support a filter loaded with coffee powder,
 a coffee boiler in fluid communication with said dispensing group,
 a water dispensing system for supplying hot water from said coffee boiler to said portafilter;
 wherein said method comprises the step of supplying steam to said dispensing group so as to perform cleaning of at least a part of said dispensing system.

The steam supplied to the dispensing group is preferably taken from said steam boiler.

The steam is preferably fed depending on a signal received from a sensor which is configured to detect whether the portafilter is connected to said dispensing group.

BRIEF DESCRIPTION OF THE DRAWINGS

The present invention will be further described below with reference to the attached figures in which.

DETAILED DESCRIPTION

Figure 1:
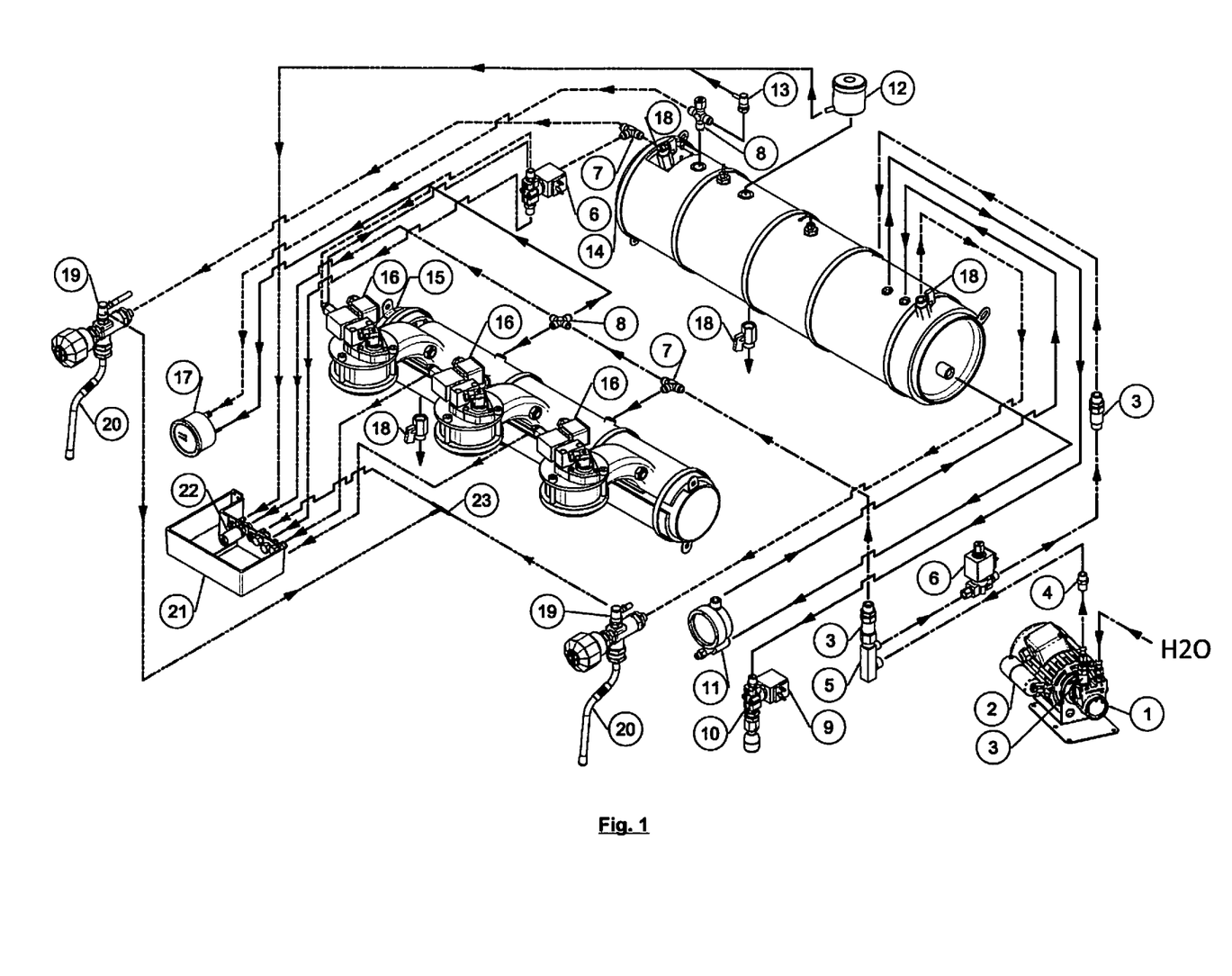
FIG. 1 shows, in schematic form, the hydraulic circuit and some of the main components of a machine for preparing and dispensing espresso coffee according to an embodiment of the invention.

FIG. 1 shows, in schematic form, a known hydraulic circuit of a machine for preparing and dispensing a beverage according to an embodiment of the present invention; The following symbols have been used for illustrative purposes: long dash-short dash lines=cold water; continuous lines=hot water; regular dash lines=steam; long dash-dot-dot lines=discharge water.

The description below, for the sake of convenience, refers in particular to an espresso coffee machine, but the present invention is not limited to such machines and is applicable to machines for dispensing other beverages. For example, instead of coffee powder, barley powder or other cereal powder may be used. Therefore, the expression "espresso coffee machine" must be understood as comprising also machines for preparing other beverages.

FIG. 1 shows an espresso coffee machine according to an embodiment of the present invention. It is shown in simplified form. Some components, which are not relevant for the purposes of understanding of the invention, are not shown and/or will not described in detail. However, for better understanding of FIG. 1, a list of the various components indicated by a reference number is provided hereinbelow:

1. Pump
2. Electric motor
3. Check valve
4. Nipple
5. Header
6. 3-way valve body
7. Nipple
8. Nipple
9. Hot water dispensing valve body
10. Hot water wand
11. Level indicator
12. Safety valve
13. Decompression valve
14. Steam boiler
15. Coffee boiler
16. Group valve body
17. Pressure gauge
18. Faucet
19. Decompression valve
20. Steam wand
21. Well
22. Expansion valve
23. Nipple With reference to the diagram shown in FIG. 1, the machine comprises a pump 1 which receives water. Typically, the pump 1 receives water which is not heated. Typically the pump 1 receives cold water from a mains water pipe and conveys said cold water under pressure to the components downstream thereof. The water which is output from the pump 1 has a temperature of about 20° C. or in any case at room temperature. The temperature of the water which passes through the pump 1 is typically influenced by the room temperature and in any case by the external temperature.

A header 5 is preferably provided downstream of the pump 1 for doubling the flow. Part of the flow is sent to a steam boiler 14 provided with an associated valve body 6 and part is fed to a coffee boiler 15. The circuit for feeding the coffee boiler 15 also has, connected thereto, an expansion valve which allows any overpressure to be controlled and allows water to be discharged from the circuit into the discharge well 21.

A safety valve 12 and a decompression valve 13 directly connected to the well 21 are preferably connected to the steam boiler 14.

Hot water is preferably drawn from the steam boiler 14 and supplied via the valve body 9 and the hot water wand 10.

The steam is also preferably taken from the steam boiler via the two mirror-symmetrical branches which connect the boiler to the two steam faucets 19 and the associated steam wands 20.

The steam boiler 14 is configured to feed the steam wand 20 preferably provided with a decompression valve 19.

The coffee boiler 15 is in fluid communication with one or more dispensing groups 25. FIG. 1 shows three delivery groups 25 supplied by the coffee boiler 15, but this arrangement is merely a non-limiting example.

Preferably, a valve body 16 is provided for each group 25. The valve body 16, in the continuation of the present description and the claims, will also be referred to as "first valve body" or "group valve body". Preferably, the group valve body 16 comprises a three-way valve. For example, the group valve body 16 may comprise a valve of the type 31A31A1V15T3BDV230AY manufactured by ODE s.r.l. Società Unipersonale, Colico, Italy. The operating principle of the group valve body 16 will be explained more clearly below.

Figure 2A:
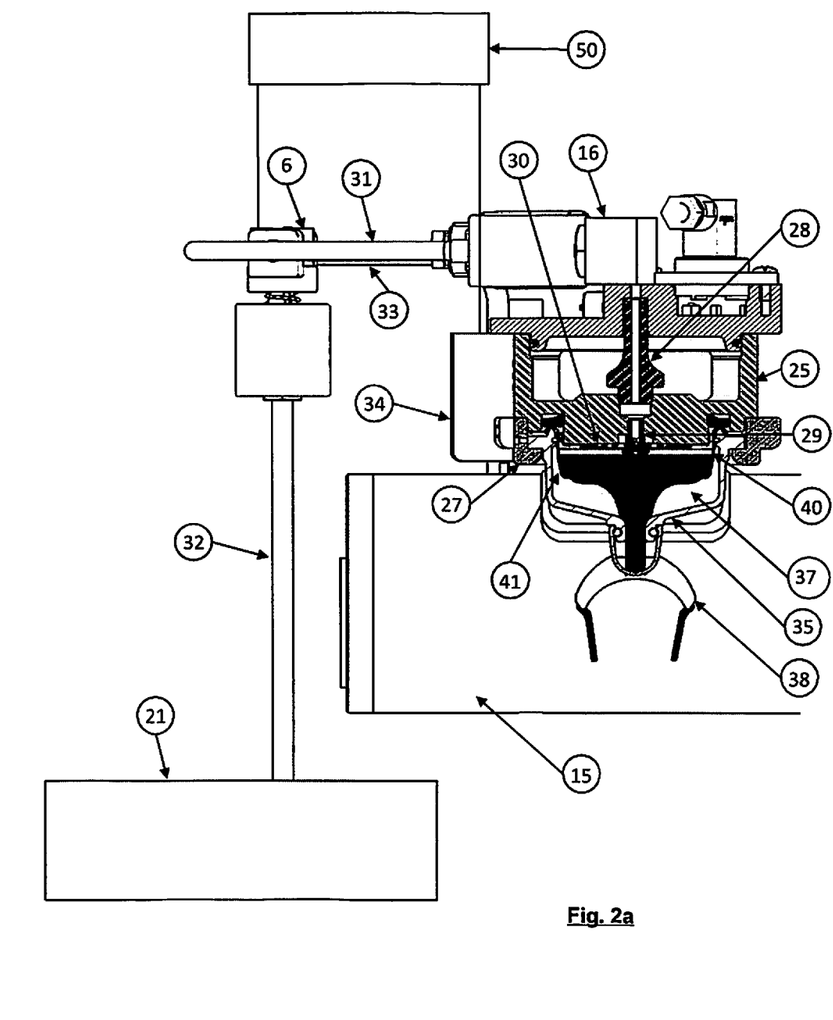
FIGS. 2a and 2b are two schematic views of a part of the espresso coffee machine according to FIG. 1.
Figure 2B:
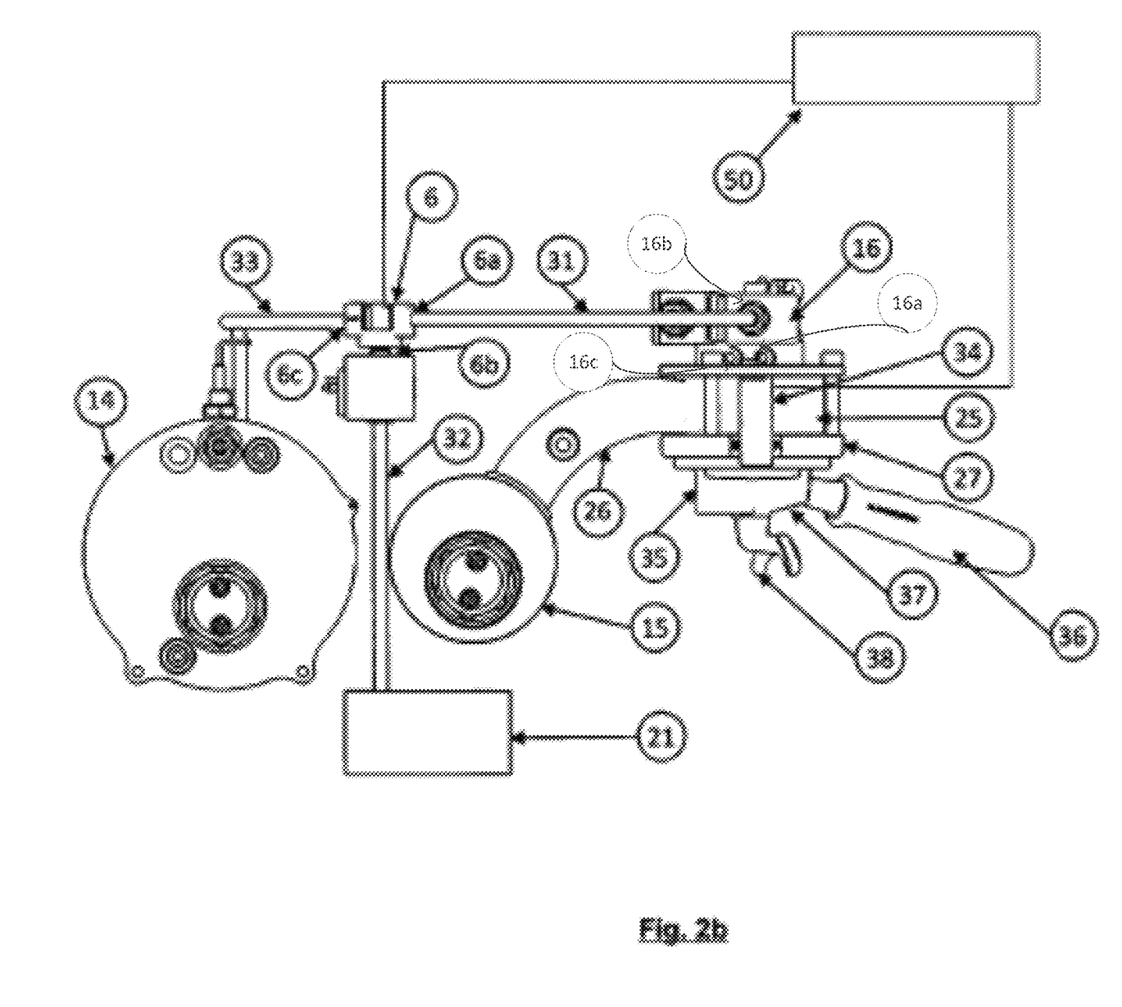

FIGS. 2a and 2b show in greater detail a portion of the machine according to an embodiment of the present invention. In particular a dispensing group 25 (also called simply "group") of the espresso coffee machine according to the invention is shown. In addition to the group 25 a number of components necessary for functional operation of the present invention are also shown. Other parts of the machine, not necessary for the present invention, are not shown and/or described.

The dispensing group 25 is in the form of a substantially cylindrical body connected to the coffee boiler 15. Preferably, the coffee boiler 15 is shaped with a neck 26. Considering again FIG. 1, the coffee boiler 15 with three necks 26, one for each group 25, is shown.

The group valve body 16 is present in the top part of the dispensing group 25. In the bottom part of the dispensing group 25 there is a seat 27 configured to receive and fix a portafilter 35. For Example, according to an embodiment, the portafilter 35 is connected to the dispensing group 25 by means of a bayonet-type connection or the like. Obviously this is only one example of a connection and other systems for connecting together group 25 and portafilter 35 are included in the present invention.

The portafilter 35 has a handle 36 and a cavity 37 configured to seat a coffee filter 40. The filter 40 is filled, at least partly, with coffee powder. The coffee powder is generally pressed and forms a so-called coffee puck or plug 41. The water, at a predetermined temperature and a predetermined pressure, is forced to pass through the coffee puck 41 and flows out from a curved spout 38 (single or double, as shown in the figure) on the bottom of the portafilter 35.

The dispensing group 25 also comprises a duct 28, a diffuser 29 and a so-called screen 30. The duct 28 extends preferably in the direction of the dispensing group 25, as shown in FIG. 2a. The diffuser 29 is connected to a cavity of the group 25 at the top of which the duct 28 is also connected. The screen 30 is in the form of a perforated disk and serves to distribute the water from the diffuser 29 as uniformly as possible and prevent the coffee powder from rising up at the end of the dispensing as a result of the difference in pressure.

As already mentioned, the group valve body 16 is mounted on the dispensing group 25. Preferably, and as shown in FIG. 2b, and the group valve body 16 comprises a three-way valve: a first way 16a is fluid communication with the duct 28, a second way 16b is in fluid communication with a pipe 31 and a third way 16c is in fluid communication with the coffee boiler 15.

The pipe 31 connected to the second way of the group valve body 16 is in turn connected to a second valve body 6. Preferably, the second valve body 6 comprises a three-way valve. For example, the second valve body 6 may comprise a valve of the type 31A3ACV30-U manufactured by ODE s.r.l. Società Unipersonale, Colico (LC), Italy.

For the sake of easier illustration, FIG. 1 shows only one valve body 6 connected to the group positioned at the left-hand end of FIG. 1. However, preferably, one valve body 6 is provided for each group 25 of the machine.

As clearly shown in FIG. 2b, a first way 6a (on the right in the drawing) receives the pipe 31 connected to the second way of the group valve body 16, a second way 6b (directed downwards in the drawing) is connected to a discharge pipe 32 and a third way 6c (on the left in the drawing) receives a steam pipe 33 connected to the steam boiler 14.

According to a preferred embodiment, the dispensing group 25 may also comprise a sensor 34 for detecting when a portafilter 35 is present and correctly engaged inside the seat 27.

According to a preferred embodiment, a processor 50 is provided for processing data from the sensor 34 and/or from the second valve body 6 (and/or other components of the machine). In addition or as an alternative, the processor 50 is configured to control the second valve body 6 so as to open or close either the second way 6b or the third way 6c. The processor 50 could comprise a processor (CPU) mounted on an electronic board.

For the purpose of the present invention, the expression "dispensing system" is understood as meaning a plurality of components, downstream of the coffee boiler and upstream of the coffee puck, which are passed through by hot water under pressure during a cycle for dispensing the espresso coffee. For example, according to an embodiment of the present invention, the dispensing system comprises the group valve body 16, the duct 28, the diffuser 29 and the screen 30. In other embodiments, the dispensing system could comprise (also) other components or two or more components of the dispensing system could be combined to form a single component. For example, screen and diffuser could be in the form of a single component. According to another example, duct and diffuser could be formed as a single component.

For the purpose of the present invention, the expression "discharging system" is understood as meaning a plurality of components, downstream of the coffee puck, which are passed through by the water during a discharging cycle which follows a cycle for dispensing the espresso coffee. For example, according to an embodiment of the present invention, the discharging system comprises the screen 30, the diffuser 29, the duct 28, the group valve body 16, the pipe 31, the second valve body 6 and the discharge pipe 32. In other embodiments, the discharging system could comprise (also) other components or two or more components of the discharging system could be combined to form a single component. For example, screen and diffuser could be in the form of a single component. According to another example, duct and diffuser could be formed as a single component.

The dispensing system and the discharging system could comprise components which are common to either system. For example, in the embodiment described in detail, the screen 30, the diffuser 29, the duct 28 and the group valve body 16 are common both to the dispensing system and to the discharging system. They are in fact passed through by hot water under pressure during the dispensing step and by discharging water during the discharging step.

The machine according to the present invention is configured to operate in three modes: 1) dispensing of the beverage, 2) discharging of the water from the dispensing circuit, and 3) cleaning of the circuit. Hereinbelow, with reference to the various Figures, the three modes will be described in detail below.

Figure 3A:
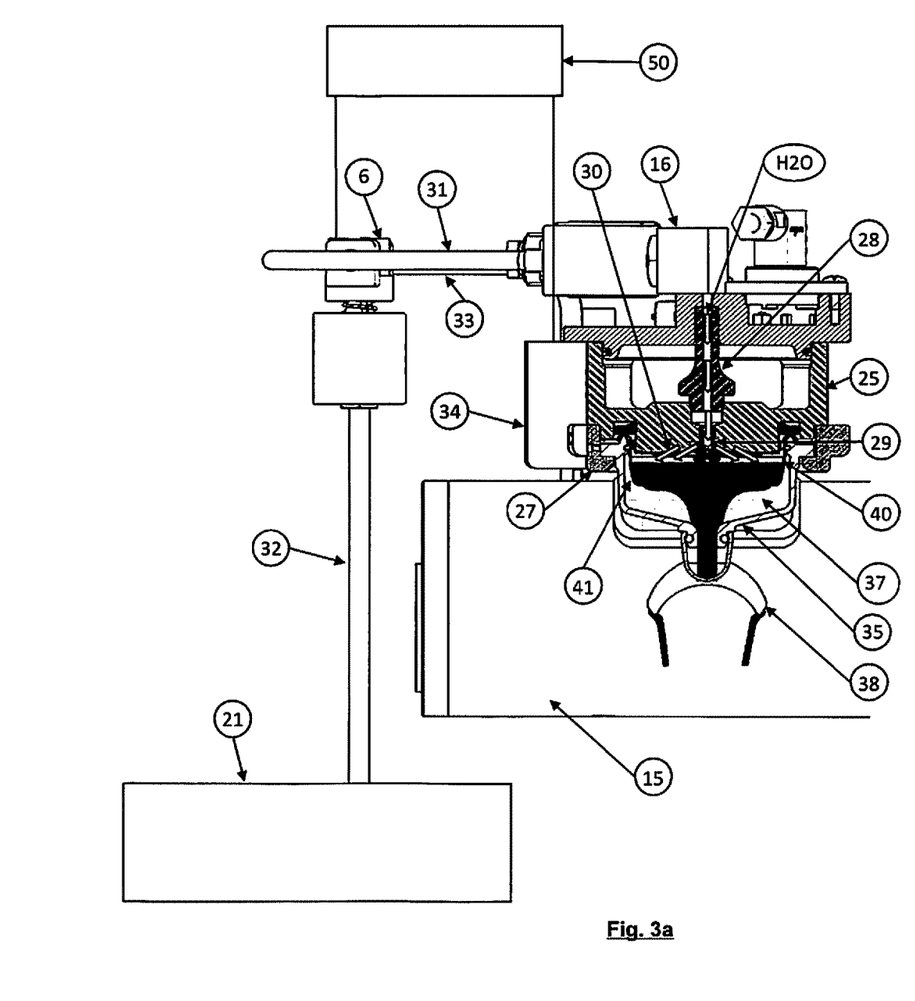
FIGS. 3a and 3b are two views similar to FIGS. 2a and 2b which illustrate the dispensing cycle.
Figure 3B:
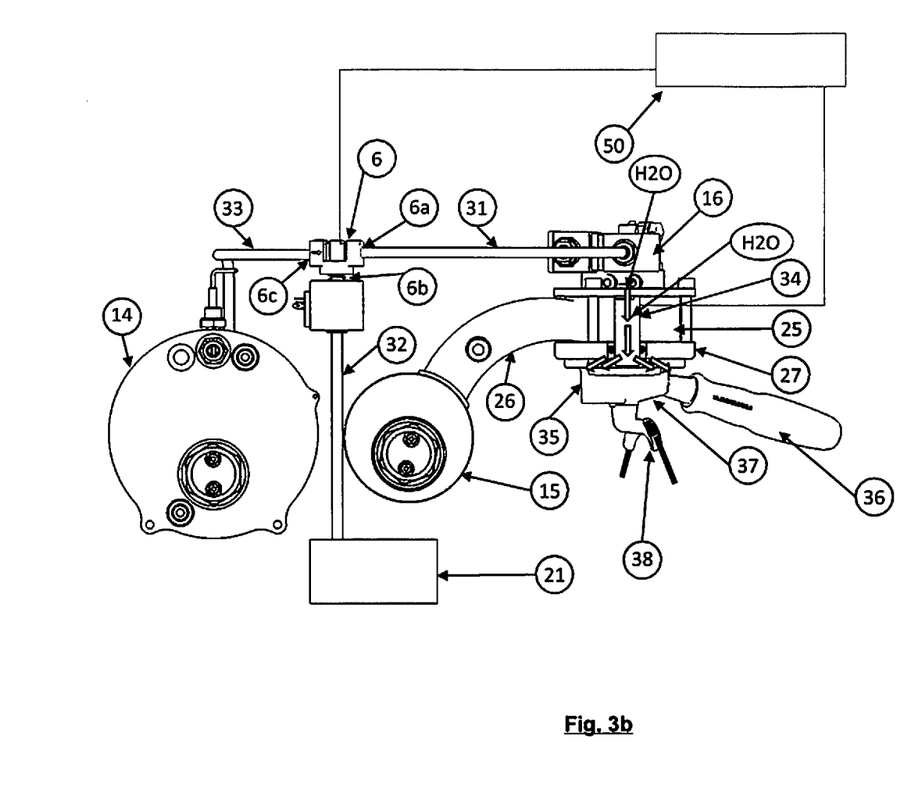

With reference to FIGS. 3a and 3b, the dispensing cycle used to prepare an espresso coffee or a similar beverage will be described.

When a dispensing command is issued, the hot water from the coffee boiler 15 passes through the third way of the group valve body 16, is directed into the first way and then into the duct 28, and into the diffuser 29 as far as the screen 30. The screen 30 distributes uniformly the hot water over the puck 41 of coffee powder. The hot water then passes through the coffee puck 41, passes through the holes 40 in the filter 40 and flows out through the spout 38 of the portafilter 35. Flowing of the fluid through the aforementioned components continues for the entire duration of dispensing of the beverage. Usually a container, such as a small cup or the like, is placed underneath the spout 38 in order to collect the espresso coffee which is dispensed. During the dispensing cycle, the way 6c of the valve body 6 remains closed, while the ways 6a and 6b are open even though there is no passage of fluids.

Figure 4A:
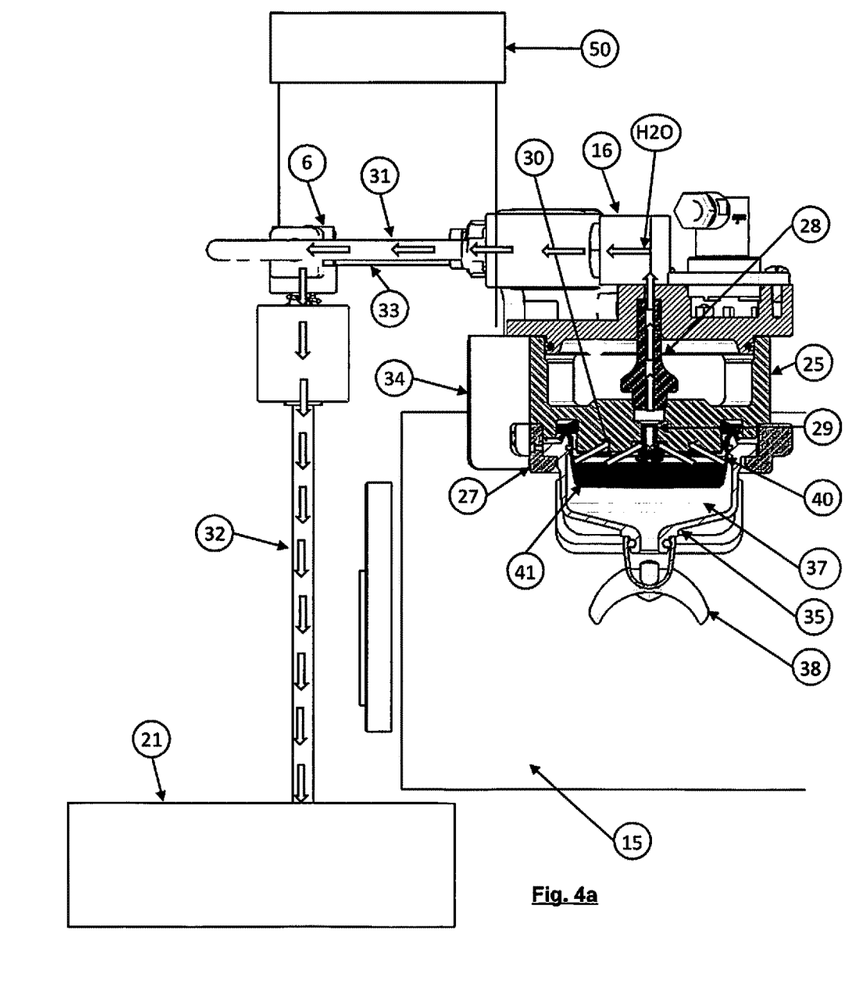
FIGS. 4a and 4b are two views similar to FIGS. 2a and 2b which illustrate the discharging cycle.
Figure 4B:
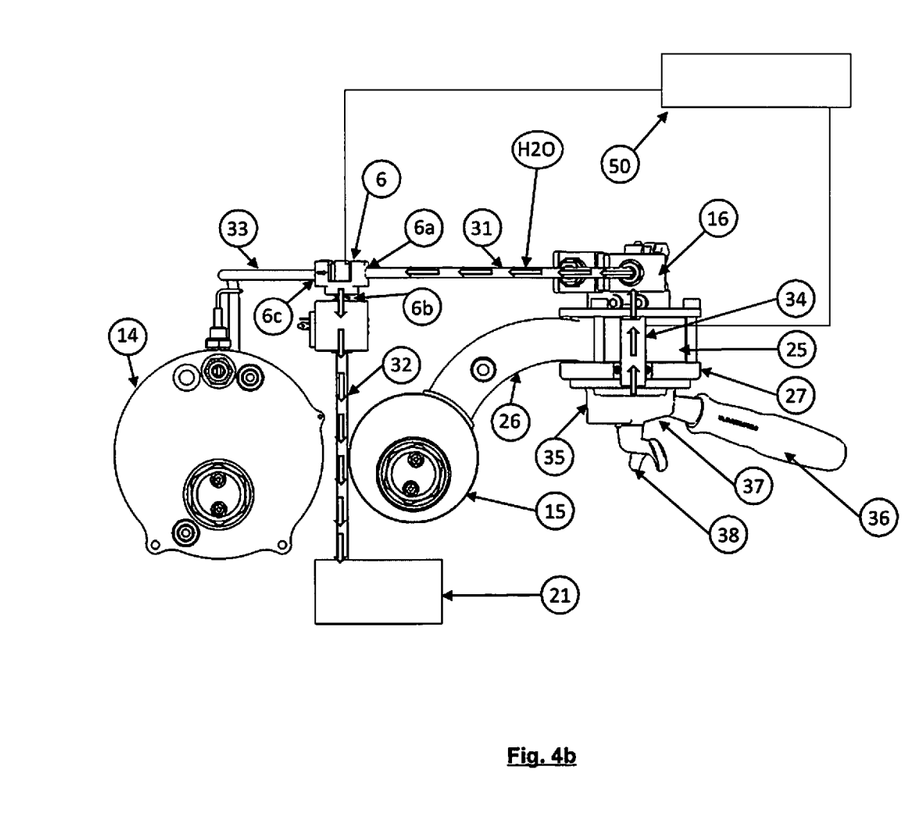

With reference to FIGS. 4a and 4b, the cycle for discharging or emptying the system, which is activated at the end of dispensing, will be described.

Dispensing of the coffee may be terminated by means of a manual command or may be controlled by electronic control components (for example the aforementioned processor 50). Once dispensing of the coffee has terminated, the fluid left above the coffee puck 41 and partly the fluid contained inside it, owing to the difference in pressure generated by the coffee puck 41, reverses its direction and rises back up the system comprising the screen 30, the diffuser 29, the duct 28, the second way of the first valve body 16, the pipe 31, the second valve body 6, the discharge pipe 32 and then the discharge well 21. In this way the circuit is emptied substantially entirely of the water and returns to the ambient pressure, thus making it possible to remove safely the portafilter 35 (in order to remove the used coffee, replace it with another puck of coffee powder and prepare another espresso coffee).

Therefore, during the discharging cycle, the ways 6a and 6b of the valve body 6 remain open, while the third way 6c is closed.

Optionally, before preparing another coffee and before engaging the portafilter 35 with the dispensing group 25, the barista may allow hot water to flow out freely in order to remove other used coffee residues and dirty water.

Figure 5A:
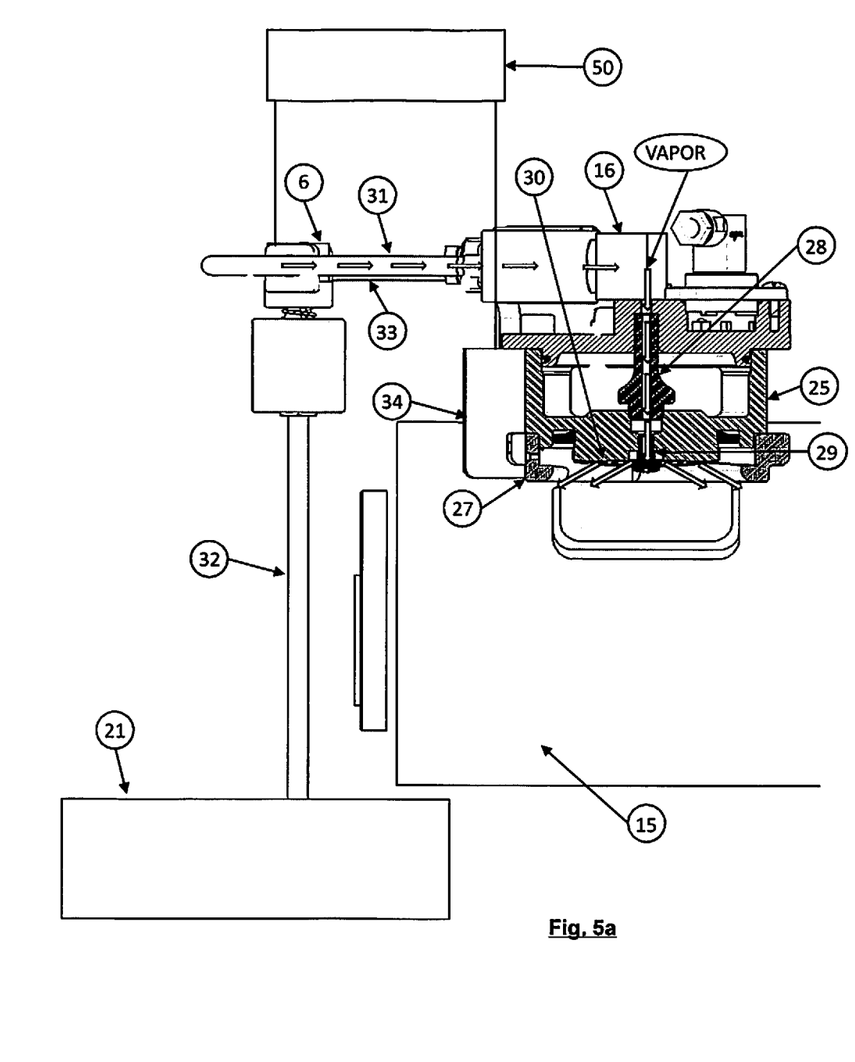
FIGS. 5a and 5b are two views similar to FIGS. 2a and 2b which illustrate the cleaning cycle.
Figure 5B:
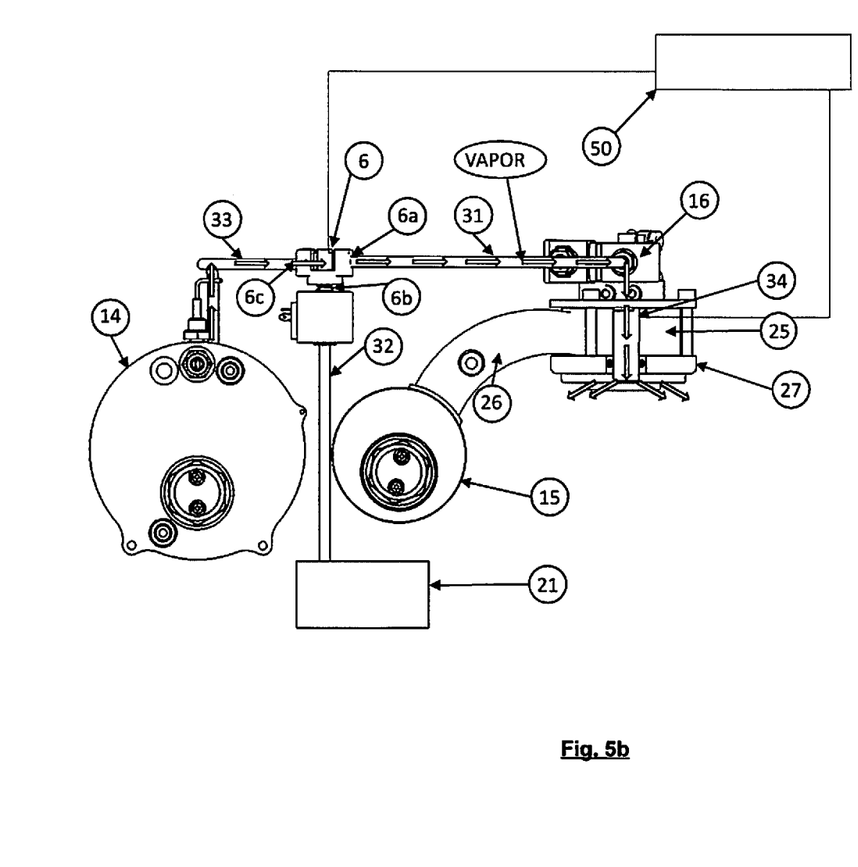

The third operating mode of the machine according to the invention is shown in FIGS. 5a and 5b. This mode consists of a mode for cleaning at least part of the dispensing system and in particular the screen 30. According to one embodiment, this mode is activated by the barista, for example at the end of a dispensing cycle and/or before starting a new dispensing cycle. According to another embodiment, this mode is activated electronically by means of the sensor 34 and the processor 50: when the sensor 34 detects that the barista has completed a dispensing cycle, that the discharging cycle has also ended and that that barista has removed the portafilter, the cleaning cycle is automatically activated. According to further alternatives, the cleaning cycle could be activated automatically after a predetermined number of dispensing cycles and/or at predetermined times. Also the duration of the cleaning cycle may be decided by the barista or may be fixed. For example, the cleaning cycle programmed (at time intervals or after a certain number of dispensing cycles) may be longer and more thorough than the manual cycle which is managed independently by the barista.

During the cleaning cycle, the second valve body 6 (also called steam control valve body) opens the third way 6c for connection to the steam boiler 14 and allows the steam supplied from the steam boiler 14 and contained inside the steam removal pipe 33 to pass inside the pipe 31 which operated as a discharge pipe for the group valve body 16 during the discharging step.

The steam continues its path along the second way of the group valve body 16, into the duct 28, inside the diffuser 29, onto the screen 30 and then flows out from the group 25. The path of the steam is indicated by means of arrows in FIGS. 5a and 5b. Obviously, preferably the steam must not be hindered by the filter and/or the portafilter. Therefore, the latter must be preferably removed during the cleaning cycle.

Some parameters could be controlled by the user via the aforementioned processor or other electronic control system. For example, the duration of the steam flow could be controlled. In addition and/or alternatively, the frequency of the cleaning cycle could be controlled. In addition and/or alternatively the delay in starting of the third phase of the cycle could be controlled by disengagement of the portafilter.

The expression "control of the frequency of the cycle" is understood as meaning the possibility of choosing after how many dispensing operations to activate the cleaning cycle, but also the possibility of setting a cleaning cycle comprising several consecutive steam and water dispensing operations activated by the user.

As mentioned above, a big advantage of the present invention consists in the fact that the steam used for the cleaning cycle may be taken from the steam source (steam boiler) which is generally already present in an espresso coffee dispensing machine, in particular in machines intended for professional use.

Advantageously, owing to the present invention, a significant functional improvement is obtained. In fact, the passage of the steam through the screen 30, the diffuser 29, the duct 28, the group valve body 16 and the discharge pipe 31 of the group valve body 16 allows the removal of the used coffee particles from inside them. By so doing, it is possible to prevent hot used coffee particles remaining in conditions where no dispensing is performed, reducing significantly the maintenance operations needed to prevent blockage.

The Applicant estimates that, with the machine according to the present invention, the time interval at which maintenance must be carried out could be prolonged about nine times compared to a conventional machine.

Another important advantage obtained with the present invention is that of maintaining the organoleptic properties of the espresso coffee dispensed. In fact, the cleaning cycle, by means of the steam flow, allows the removal of used coffee particles from the group valve body 16, from the duct 28, from the diffuser 29 and from the screen 30 which are passed through by the water from the coffee boiler, also during dispensing. It is thus possible to preserve unchanged the organoleptic properties of the coffee and prevent them from being altered by the particles resulting from discharging during the previous cycles.

Another important advantage obtained by the present invention is that of maintaining the flowrate and direction of the water. In fact, owing to removal of used coffee from the dispensing system it is possible maintain a constant water through-flow area and consequently a constant water flow-rate. Moreover, owing to removal of the obstacles along the dispensing path, it is possible to avoid the creation of preferential paths for the fluid, with a consequent lack of uniformity of the water jet on the coffee puck, and a reduction in the efficient use of said jet.

Another important advantage obtained by the present invention is that of preservation of the drying efficiency. Owing to the removal of the used coffee from the discharge circuit, it is possible to keep the liquid removal capacity of the circuit constant. This ensures that there is always a constant amount of residual water at the end of dispensing above the coffee puck, avoiding the increase thereof which occurs in conventional systems and which is directly related to blockage of the discharge system.

The invention claimed is:

1. An espresso coffee machine comprising:
   a pump configured to pump water,
   a dispensing group configured to cooperate with a portafilter, wherein said portafilter is configured to support a filter loaded with coffee powder,
   a coffee boiler in fluid communication to supply hot water to said dispensing group, and
   a group valve body mounted on the dispensing group, the group valve body comprising a group valve body first way connected to a duct which communicates with the portafilter, a group valve body second way, and a group valve body third way in fluid communication with the coffee boiler;
   the espresso coffee machine further comprising a steam dispensing system, wherein said steam dispensing system comprises a steam boiler and a steam valve body with a plurality of steam valve body ways, wherein a steam valve body first way is configured to supply steam to the dispensing group through the group valve body second way and through the duct which communicates with the portafiler to supply steam to said dispensing group so as to perform cleaning of at least a part of said dispensing group, a steam valve body second way is connected to a discharge pipe, and a steam valve body third way is in fluid communication with said steam boiler.

2. The machine according to claim 1, wherein said dispensing group comprises a screen.

3. The machine according to claim 1, further comprising a sensor configured to detect whether the portafilter is connected to said dispensing group.

4. The machine according to claim 3, further comprising a processor configured to supply steam to said dispensing group depending on a signal received from said sensor.

5. The machine according to claim 1, comprising two or more dispensing groups.

6. The machine according to claim 1, wherein said steam valve body is situated above the portafilter.

7. The machine according to claim 1, wherein said steam dispensing system is provided also to prepare steam for a beverage other than espresso coffee.

8. A method for cleaning a water dispensing system of an espresso coffee machine, wherein the machine comprises:
   a pump configured to pump water,
   a dispensing group configured to cooperate with a portafilter, wherein said portafilter is configured to support a filter loaded with coffee powder,
   a coffee boiler in fluid communication to supply hot water to said dispensing group,
   a group valve body mounted on the dispensing group, the group valve body comprising a group valve body first way connected to a duct which communicates with the portafilter, a group valve body second way, and a group valve body third way in fluid communication with the coffee boiler;
   a steam dispensing system comprising a steam boiler and a steam valve body with a plurality of ways, wherein a steam valve body first way is configured to supply steam to the dispensing group through the group valve body second way and through the duct which communicates with the portafiler, a steam valve body second way is connected to a discharge pipe, and a steam valve body third way is in fluid communication with said steam boiler,
   wherein said method comprises supplying steam from the steam dispensing system to said dispensing group through the steam valve body first way and the group valve body second way to perform cleaning of at least a part of said dispensing group.

9. The method according to claim 8, further comprising taking steam supplied to the dispensing group from said steam boiler.

10. The method according to claim 8, further comprising feeding the steam depending on a signal received from a sensor which is configured to detect whether the portafilter is connected to said dispensing group.

11. The method according to claim 8, wherein said steam valve body is situated above the portafilter.

12. The method according to claim 8, wherein said steam dispensing system is provided also to prepare steam for a beverage other than espresso coffee.

13. An espresso coffee machine comprising:
   a dispensing group configured to cooperate with a portafilter, wherein said portafilter is configured to support a filter loaded with coffee powder,
   a group valve body mounted on the dispensing group, the group valve body comprising a group valve body first way connected to a duct which communicates with the portafilter, a group valve body second way, and a group valve body third way through which hot water is supplied to the dispensing group; the expresso coffee; machine further comprising a steam dispensing system, wherein said steam dispensing system comprises a steam valve body with a plurality of steam valve body ways, wherein a steam valve body first way is configured to supply steam to the dispensing group through the group valve body second way and through the duct which communicates with the portafiler to supply steam to said dispensing group so as to perform cleaning of at least a part of said dispensing group, a steam valve body second way is connected to a discharge pipe, and a steam valve body third way through which steam is supplied to the steam dispensing group.

14. The machine according to claim 13, wherein said dispensing group comprises a screen.

15. The machine according to claim 13, further comprising a sensor configured to detect whether the portafilter is connected to said dispensing group.

16. The machine according to claim 15, further comprising a processor configured to supply steam to said dispensing group depending on a signal received from said sensor.

17. The machine according to claim 13, comprising two or more dispensing groups.

* * * * *